(12) United States Patent
Fukuda et al.

(10) Patent No.: US 7,575,792 B2
(45) Date of Patent: Aug. 18, 2009

(54) HONEYCOMB FILTER FOR CLARIFYING EXHAUST GAS AND METHOD FOR MANUFACTURE THEREOF

(75) Inventors: Tsutomu Fukuda, Kakogawa (JP); Masahiro Fukuda, Uji (JP); Masaaki Fukuda, Kakogawa (JP); Toshinobu Yoko, Uji (JP); Masahide Takahashi, Uji (JP)

(73) Assignee: Ohcera Co., Ltd., Osaka-shi (JP)

( * ) Notice: Subject to any disclaimer, the term of this patent is extended or adjusted under 35 U.S.C. 154(b) by 235 days.

(21) Appl. No.: 10/559,337

(22) PCT Filed: Jul. 9, 2004

(86) PCT No.: PCT/JP2004/010147

§ 371 (c)(1),
(2), (4) Date: Dec. 5, 2005

(87) PCT Pub. No.: WO2005/005019

PCT Pub. Date: Jan. 20, 2005

(65) Prior Publication Data
US 2007/0059484 A1    Mar. 15, 2007

(30) Foreign Application Priority Data
Jul. 11, 2003    (JP) .............................. 2003-196119

(51) Int. Cl.
*B02B 3/12* (2006.01)
*C04B 35/00* (2006.01)
*C04B 35/16* (2006.01)
*C04B 35/03* (2006.01)
*C04B 35/64* (2006.01)
*B01J 8/02* (2006.01)

(52) U.S. Cl. ........................ 428/116; 501/153; 501/154; 501/136; 501/108; 428/303; 423/213.2; 264/630

(58) Field of Classification Search .................. 428/116
See application file for complete search history.

(56) References Cited

U.S. PATENT DOCUMENTS 3,366,498 A * 1/1968 Osborne ..................... 501/128

(Continued)

FOREIGN PATENT DOCUMENTS

EP        0 036 052 A1    9/1981

(Continued)

OTHER PUBLICATIONS

Takahashi et al., "Preparation, Structure, and Properties of Thermally and Mechanically Improved Aluminum Titanate Ceramics Doped with Alkali Feldspar", J. Amer. Ceram. Soc., 85 [12] 3025-30 (2002).*
Giordano et al. Journal of European Ceramic Society 22 (2002) 1811-1822.*
U.S. Appl. No. 10/568,972, filed Feb. 22, 2006, Fukuda, et al.
U.S. Appl. No. 10/566,270, filed Jan. 30, 2006, Fukuda, et al.
U.S. Appl. No. 10/559,337, filed Dec. 5, 2005, Fukuda, et al.

*Primary Examiner*—David R Sample
*Assistant Examiner*—Nicole T Gugliotta
(74) *Attorney, Agent, or Firm*—Oblon, Spivak, McClelland, Maier & Neustadt, P.C.

(57) ABSTRACT

A honeycomb filter, for removing from exhaust gas fine solid particles containing carbon, is an aluminum magnesium titanate sintered product obtained by firing at from 1000 to 1700° C. a product formed from a mixture comprising a Mg-containing compound, an Al-containing compound and a Ti-containing compound in the same metal component ratio as the metal component ratio of Mg, Al and Ti in aluminum magnesium titanate represented by the empirical formula $Mg_xAl_{2(1-x)}Ti_{(1+x)}O_5$ (wherein $0<x<1$), or a mixture comprising 100 parts by mass, as calculated as oxides, of the above-mentioned mixture and from 1 to 10 parts by mass of an alkali feldspar represented by the empirical formula $(Na_yK_{1-y})AlSi_3O_8$ (wherein $0 \leq y \leq 1$).

6 Claims, 2 Drawing Sheets

U.S. PATENT DOCUMENTS

| | | | |
|---|---|---|---|
| 3,531,307 A * | 9/1970 | Bleecher et al. | 501/119 |
| 3,930,522 A * | 1/1976 | Turner | 138/111 |
| 4,307,198 A * | 12/1981 | Oda et al. | 501/119 |
| 4,483,940 A * | 11/1984 | Ono et al. | 502/159 |
| 4,625,511 A * | 12/1986 | Scheitlin et al. | 60/299 |
| 5,565,245 A * | 10/1996 | Sun et al. | 427/430.1 |
| 6,004,501 A * | 12/1999 | Cornelius et al. | 264/631 |
| 6,284,705 B1 * | 9/2001 | Park et al. | 502/417 |
| 6,620,751 B1 | 9/2003 | Ogunwumi | |
| 2003/0015829 A1 * | 1/2003 | Fukuda et al. | 264/674 |
| 2006/0239880 A1 * | 10/2006 | Fukuda et al. | 423/213.2 |

FOREIGN PATENT DOCUMENTS

| | | | |
|---|---|---|---|
| EP | 0 210 813 A2 | | 2/1987 |
| JP | 56-134560 | | 10/1981 |
| JP | 57-35918 | | 2/1982 |
| JP | 5-115721 | | 5/1993 |
| JP | 5-214922 | | 8/1993 |
| JP | 8-290963 | | 11/1996 |
| JP | 01/37971 | | 5/2001 |
| JP | 2003-515023 | | 4/2003 |
| WO | WO 92/09388 | | 6/1992 |
| WO | WO2004/039747 | * | 5/2004 |

* cited by examiner

Fig. 4

HONEYCOMB FILTER FOR CLARIFYING EXHAUST GAS AND METHOD FOR MANUFACTURE THEREOF

TECHNICAL FIELD

The present invention relates to a honeycomb filter for cleaning exhaust gas, to capture and remove fine solid particles (particulates) containing carbon as the main component, contained in an exhaust gas from e.g. a Diesel engine, and a process for its production.

BACKGROUND ART

In an exhaust gas from e.g. a Diesel engine of e.g. an automobile, particulates containing carbon as the main component are contained in a substantial concentration (from 150 to 250 mg/Nm$^3$) and thus cause an environmental problem together with nitrogen oxides, etc. Accordingly, it is desired to remove them efficiently and economically. Heretofore, various filters have been proposed to capture and remove such fine solid particles contained in exhaust gases.

For example, JP-A-57-35918 or JP-A-5-214922 discloses an exhaust gas filter wherein both ends of a honeycomb filter are alternately plugged at the upstream end or the downstream end of a plurality of channels. A honeycomb filter of this type has a structure such that a combustion exhaust gas to be cleaned, is supplied to openings on the upstream side of the filter and permitted to pass through partition walls of the filter, so that particulates in the exhaust gas are captured and removed by partition walls, and then, the exhaust gas after cleaning is taken out from openings at the downstream side of the filter.

On the other hand, the material for such a honeycomb filter is required to have not only high heat resistance but also a small thermal expansion coefficient and high thermal shock resistance, since it is exposed to a rapidly heated or cooled environment, and accordingly, silicon carbide or cordierite material has been proposed and practically used. However, such a material still has no adequate properties as an exhaust gas filter.

Namely, with an exhaust gas filter, it is likely that when captured non-combustion carbonaceous fine solid particles are abnormally deposited, such carbon will catch-fire and burn, whereby an abrupt temperature rise will take place so that the temperature locally reaches from 1,400 to 1,500° C. In such a case, a filter made of silicon carbide material will have a temperature distribution at various places of the filter, and the thermal expansion coefficient is about $4.2 \times 10^{-6} K^{-1}$ i.e. not so small, whereby cracks are likely to form by the thermal stress or thermal shock exerted to the material, thus leading to partial breakage. On the other hand, in the case of a filter made of cordierite material, the thermal expansion coefficient is small at a level of from 0.6 to $1.2 \times 10^{-6} K^{-1}$, whereby the problem of cracks due to thermal shock is less, but the melting point is not so high at a level of from 1,400 to 1,450° C., whereby a problem of partial melting due to the above-mentioned abnormal combustion of carbon becomes serious.

Once defects are formed in the interior of an exhaust gas filter by the breakage or melting of the filter as described above, the efficiency of the filter for capturing carbon decreases, and at the same time, the pressure of the exhaust gas exerted to the filter will be an excessive load to the defective portions and thus induce new breakage. Consequently, the entire exhaust gas filter will fail to function.

As the material for such a honeycomb filter, WO01/037971 proposes aluminum titanate as well as silicon carbonate or cordierite. Aluminum titanate is a material having heat resistance at a high temperature exceeding 1,700° C. and a small thermal expansion coefficient and excellent thermal shock resistance. However, on the other hand, aluminum titanate has a serious problem that since it has a decomposition region usually within a temperature range of from 800 to 1,280° C., it can not be used with stability within a fluctuated temperature region containing such a temperature range. Further, it has a difficulty such that since the anisotropy of its crystal structure is substantial, slippage by a thermal stress is likely to take place, and the mechanical strength is not high enough. Accordingly, it still has had a problem in its use for the production of a honeycomb having a thin wall thickness and a high cell density or in its use as an exhaust gas filter to be subjected to a load such as mechanical vibration at a high temperature, as mounted on an automobile or the like.

It is an object of the present invention to provide a honeycomb filter for cleaning exhaust gas, which is excellent in heat resistance, has a small thermal expansion coefficient and excellent thermal shock resistance, is free from thermal decomposition even at a high and fluctuating temperature and has high mechanical strength so that it can be used with stability for a long period of time and which is capable of capturing and removing, with high efficiency, particulates such as fine carbon particles contained in an exhaust gas from e.g. a Diesel engine, and a process for its production.

DISCLOSURE OF THE INVENTION

As a result of an extensive study to solve the above-mentioned problems, the present invention has been accomplished on the basis of a discovery such that a honeycomb filter for cleaning exhaust gas, employing an aluminum magnesium titanate sintered product obtainable by firing a mixture comprising a Mg-containing compound, an Al-containing compound and a Ti-containing compound in a specific ratio, or a mixture having a specific alkali feldspar preferably added in a specific amount to such a mixture, has its thermal decomposition resistance increased and its mechanical strength improved, while maintaining the excellent heat resistance, small thermal expansion coefficient and high thermal shock resistance as inherent properties of conventional aluminum titanate ceramics.

Thus, the present invention provides the following:

(1) A honeycomb filter for cleaning exhaust gas, which is a honeycomb filter for removing fine solid particles containing carbon as the main component in an exhaust gas, characterized in that the material for the honeycomb filter is an aluminum magnesium titanate sintered product obtained by firing at from 1000 to 1700° C. a mixture comprising a Mg-containing compound, an Al-containing compound and a Ti-containing compound in the same metal component ratio as the metal component ratio of Mg, Al and Ti in aluminum magnesium titanate represented by the empirical formula $Mg_xAl_{2(1-x)}Ti_{(1+x)}O_5$ (wherein 0<x<1).

(2) A honeycomb filter for cleaning exhaust gas, characterized in that the material for the honeycomb filter is an aluminum magnesium titanate sintered product obtained by firing at from 1000 to 1700° C. a mixture comprising 100 parts by mass, as calculated as oxides, of a mixture comprising a Mg-containing compound, an Al-containing compound and a Ti-containing compound in the same metal component ratio as the metal component ratio of Mg, Al and Ti in aluminum magnesium titanate represented by the empirical formula $Mg_xAl_{2(1-x)}Ti_{(1+x)}O_5$ (wherein 0<x<1), and from 1 to 10 parts by mass of an alkali feldspar represented by the empirical formula $(Na_yK_{1-y})AlSi_3O_8$ (wherein $0 \leq y \leq 1$).

(3) The honeycomb filter for cleaning exhaust gas according to the above (1) or (2), wherein the honeycomb filter has a wall thickness of 0.2 to 0.6 mm and a cell density of from 15 to 47 cells/cm$^2$, wherein the porosity of the partition wall is from 40 to 60%, and the thermal expansion coefficient is at most $3.0 \times 10^{-6} K^{-1}$.

(4) A process for producing a honeycomb filter for cleaning exhaust gas, characterized by preparing a mixture comprising a Mg-containing compound, an Al-containing compound and a Ti-containing compound in the same metal component ratio as the metal component ratio of Mg, Al and Ti in aluminum magnesium titanate represented by the empirical formula $Mg_xAl_{2(1-x)}Ti_{(1+x)}O_5$ (wherein 0<x<1), or a mixture comprising 100 parts by mass, as calculated as oxides, of such a mixture and from 1 to 10 parts by mass of an alkali feldspar represented by the empirical formula $(Na_yK_{1-y})AlSi_3O_8$ (wherein $0 \leq y \leq 1$), adding molding assistants to the mixture, followed by kneading to plasticize the mixture to make it extrusion-processable, and then extrusion processing it into a honeycomb structure, followed by firing at from 1000 to 1700° C.

(5) The process for producing a honeycomb filter for exhaust gas according to the above (4), wherein the average particle sizes of the respective components contained in the mixture are at most 30 μm.

(6) An apparatus for cleaning exhaust gas, characterized in that the honeycomb filter for cleaning exhaust gas as defined in any one of the above (1) to (3) is accommodated in a can.

(7) The apparatus for cleaning exhaust gas according to the above (6), which is used for cleaning an exhaust gas from an automobile having a diesel engine mounted.

The reason as to why the honeycomb filter made of the aluminum magnesium titanate sintered product according to the present invention, has high thermal decomposition resistance and high mechanical strength while maintaining the inherent heat resistance, small thermal expansion coefficient and excellent thermal shock resistance as described above, is not clearly understood, but may probably be as follows.

Namely, aluminum magnesium titanate has a characteristic such that its formation temperature is lower than aluminum titanate, and it is considered that as the formation temperature is low, the thermal decomposition reaction rate of aluminum magnesium titanate tends to be small, and the thermal decomposition resistance is thereby improved. The thermal decomposition reaction rate is proportional to the product of the formation rate and the growth rate of nuclei of the decomposition phase. The formation rate of nuclei of the decomposition phase increases as the supercooled degree (the difference from the temperature in an equilibrium state) increases. On the other hand, the growth rate of nuclei depends on the diffusion coefficient of cations, and accordingly, it increases as the temperature becomes high (i.e. as the supercooled degree becomes small). These are mutually opposing factors, which means that the thermal decomposition reaction rate becomes maximum at a certain supercooled degree. Here, if it is assumed that the diffusion coefficients at the same temperature, of cations constituting aluminum magnesium titanate and aluminum titanate are substantially the same, it is considered that the maximum value of the thermal decomposition reaction rate becomes large as the equilibrium decomposition temperature is high, or as the supercooled degree is large. The formation temperature of aluminum magnesium titanate is lower by about 100° C. than aluminum titanate, the supercooled degree to present the maximum value of the thermal decomposition reaction rate will be substantially small as compared with that of aluminum titanate. Consequently, the thermal decomposition reaction of aluminum magnesium titanate will be suppressed to exhibit excellent thermal decomposition resistance.

Further, in a case where an alkali feldspar is to be incorporated to the mixture for forming aluminum magnesium titanate, by the presence of the alkali feldspar which becomes a liquid phase in the vicinity of the temperature for forming aluminum magnesium titanate, the reaction for forming aluminum magnesium titanate will take place in the liquid phase, whereby dense crystals will be formed, and the mechanical strength will be improved. And, the Si component contained in the alkali feldspar will be solid-solubilized in the crystal lattice of aluminum magnesium titanate, but it will be solid-solubilized preferentially in the aluminum titanate crystal system rather than in the magnesium titanate crystal system. The reason for this is such that the strain of the octahedron constituting the crystal structure of aluminum titanate is large among pseudobrookite crystal structures, and the crystallographic anisotropy is remarkable, whereby the crystal structure is unstable as compared with magnesium titanate.

Namely, Si is solid-solubilized preferentially in the crystal lattice of aluminum titanate and mainly occupies Al sites. At that time, rather than occupying alone the Al sites where a fundamentally trivalent electrical charge balance is maintained, tetravalent Si will form a pair with bivalent Mg in the system so that the pair of Si and Mg will be sexivalent in total and will be substituted for adjacent two Al (sexivalent in total). This will be explained also from the correlation of ionic radii of the respective cations.

On the other hand, the ionic radii of $Si^{4+}$ and $Mg^{2+}$ are 0.54 Å and 0.86 Å, respectively. The average ionic radius of the two will be 0.70 Å which is close to 0.68 Å i.e. the ionic radius of $Al^{3+}$, whereby the occupation of Al by the pair of Si and Mg is considered to be in a solid solution state which is more stable from the viewpoint of energy than the occupation by Si alone. Thus, it is considered that by the simultaneous presence is of Si and Mg, diffusion of ions among the respective cations can be suppressed even at a high temperature, and a stable crystal structure can be secured, whereby further improved thermal decomposition resistance can be obtained.

MEANING OF SYMBOLS

1: honeycomb filter 2: partition wall
3: through-hole 4,5: blockers

BEST MODE FOR CARRYING OUT THE INVENTION

In the present invention, as the material for a honeycomb filter, an aluminum magnesium titanate sintered product is used which is obtained by firing from 1,000 to 1,700° C. a mixture comprising a Mg-containing compound, an Al-containing compound and a Ti-containing compound in the same metal component ratio as the metal component ratio of Mg, Al and Ti in aluminum magnesium titanate represented by the empirical formula $Mg_xAl_{2(1-x)}Ti_{(1+x)}O_5$ (wherein 0<x<1), or a mixture comprising 100 parts by mass, as calculated as oxides, of such a mixture and from 1 to 10 parts by mass of an alkali feldspar represented by the empirical formula $(Na_yK_{1-y})AlSi_3O_8$ (wherein $0 \leq y \leq 1$).

The above Mg-containing compound, Al-containing compound and Ti-containing compound to be used as the starting materials, are not particularly limited so long as they are components capable of synthesizing aluminum magnesium titanate by firing. The Mg-containing compound, Al-containing compound and Ti-containing compound may not necessarily be separate compounds respectively, and may be a compound containing two or more metal components. Such compounds may usually be suitably selected among those to be used as starting materials for various ceramics, such as alumina ceramics, titania ceramics, magnesia ceramics, aluminum titanate ceramics, magnesium titanate ceramics, spinel ceramics and aluminum magnesium titanate ceramics. Specific examples of such compounds include oxides such as $Al_2O_3$, $TiO_2$ and MgO, composite oxides containing at least two types of metal components, such as $MgAl_2O_4$, $Al_2TiO_5$, $MgTi_2O_5$, and various spinel structures containing Mg and Ti, compounds containing one or more metal components selected from the group consisting of Al, Ti and Mg (such as carbonates, nitrates or sulfates).

The blend ratio of the Mg-containing compound, the Al-containing compound and the Ti-containing compound is such that the ratio of the metal components contained in these compounds would be a ratio similar to, preferably substantially the same ratio as, the metal component ratio of Mg, Al and Ti in aluminum magnesium titanate represented by the above empirical formula $Mg_xAl_{2(1-x)}Ti_{(1+x)}O_5$ (wherein 0<x<1, preferably $0.2 \leq x \leq 0.8$). By using the above respective compounds as mixed in such a ratio, it is possible to obtain aluminum magnesium titanate having the same metal component ratio as the metal component ratio in the mixture used as the starting material.

When a honeycomb filter of the present invention is to be obtained, an alkali feldspar is preferably incorporated as an additive to the above-mentioned mixture comprising the Mg-containing compound, the Al-containing compound and the Ti-containing compound. The alkali feldspar not only serves as a sintering assistant for aluminum magnesium titanate, but also plays a role of adding a Si component to the aluminum magnesium titanate, and it is represented by the empirical formula $(Na_yK_{1-y})AlSi_3O_8$. In the formula, y satisfies $0 \leq y \leq 1$, preferably $0.1 \leq y \leq 1$, particularly preferably $0.15 \leq y \leq 0.85$. An alkali feldspar having value y within this range, has a low melting point and is particularly effective for promoting the sintering of aluminum magnesium titanate. The amount of the alkali feldspar to be used, is usually from about 1 to 10 parts by mass, preferably from about 3 to 5 parts by mass, per 100 parts by mass of the total amount of the Mg-containing compound, the Al-containing compound and the Ti-containing compound to be used as the starting materials, as calculated as the respective oxides. In such a case, the total amount of the mixture as calculated as oxides, is the mass after carrying out heat treatment to remove moisture or organic substances contained in the above mixture, or when presintering is carried out, the mass before the main firing after the presintering.

In the present invention, to the mixture comprising the Mg-containing compound, the Al-containing compound and the Ti-containing compound, or to the mixture having an alkali feldspar added to such a mixture, other additives may be added, as the case requires, whereby the nature of the sintered product thereby obtainable, can be improved. As such other additives, oxides such as $SiO_2$, $ZrO_2$, $Fe_2O_3$, MgO, $Al_2O_3$, $TiO_2$, CaO and $Y_2O_3$, or oxides having a spinel structure containing Mg, may, for example, be mentioned. At least one of these additives may be added preferably in an amount of at most 15 parts by mass, per 100 parts by mass of the above mixture.

The above mixture is thoroughly mixed and pulverized. The mixing and pulverization of the mixture are not particularly limited and can be carried out by known methods. For example, they may be carried out by means of a ball mill, a medium-stirring mill, etc. The pulverization degree of the above mixture is not particularly limited, but the average particle size is preferably at most 30 μm, particularly preferably from 8 to 15 μm. The smaller the average particle size, the better, so long as it is within a range where no secondary particles will be formed.

Molding assistants may preferably be incorporated to the above mixture. As such molding assistants, known agents such as a binder, a pore-forming agent, a release agent, a defoaming agent and a peptizer may be employed. As the binder, polyvinyl alcohol, microwax emulsion, methylcellulose or carboxymethylcellulose may, for example, be preferred. As the pore-forming agent, activated carbon, coke, a polyethylene resin, starch or graphite may, for example, be preferred. As the release agent, a stearic acid emulsion may, for example, be preferred; as the defoaming agent, n-octyl alcohol or octylphenoxyethanol may, for example, be preferred; and as the peptizer, diethylamine or triethylamine may, for example, be preferred.

The amounts of the molding assistants are not particularly limited. However, in the case of the present invention, they are preferably within the following ranges, respectively, as calculated as solid contents, per the total content of 100 parts by weight of the Mg-containing compound, the Al-containing compound and the Ti-containing compound to be used as the starting materials, as calculated as the respective oxides. Namely, it is preferred to use the binder in an amount of from about 0.2 to 0.6 part by mass, the pore-forming agent in an amount of from about 40 to 60 parts by mass, the release agent in an amount of from about 0.2 to 0.7 part by mass, the defoaming agent in an amount of from about 0.5 to 1.5 parts by mass and the peptizer in an amount of from about 0.5 to 1.5 parts by mass.

The mixture having such molding assistants incorporated, is mixed, kneaded and plasticized so that it is extrusion-processable, followed by extrusion processing to form a honeycomb structure. As the method for extrusion, a known method may be used, and the shape of each cell of the honeycomb may be circular, oval, tetragonal or triangular. Further, the entire configuration of the honeycomb molded product may be either cylindrical or square tubular. The molded honeycomb body is preferably dried and then fired at from 1,000 to 1,700° C., preferably from 1,250 to 1,500° C. The firing atmosphere is not particularly limited and is preferably an oxygen-containing atmosphere such as in the air which is commonly employed. The firing time is not particularly limited so long as the firing can be done until the sintering proceeds sufficiently, and it is usually at a level of from 1 to 20 hours.

Also with respect to the temperature raising rate or the temperature lowering rate at the time of the above firing, there is no particular restriction, and such conditions may be suitably set so that no cracks will be formed in the obtainable sintered product. For example, it is preferred to gradually raise the temperature without rapid rise of the temperature to sufficiently remove the molding assistants such as moisture, a binder, etc. contained in the above mixture. Further, if necessary, prior to heating at the above-mentioned firing temperature, presintering may be carried out preferably within a temperature range of from 500 to 1,000° C. for from 10 to 30 hours by mild temperature raise, whereby the stress in the sintered product which causes cracking during the formation of aluminum magnesium titanate, can be relaxed, and formation of cracks in the sintered product can be suppressed to obtain a uniform sintered product.

The sintered product thus obtainable will be aluminum magnesium titanate represented by the empirical formula $Mg_xAl_{2(1-x)}Ti_{(1+x)}O_5$ (wherein $0<x<1$) or aluminum magnesium titanate wherein the Si component contained in an alkali feldspar is solid-solubilized in the crystal lattice of aluminum magnesium titanate. Such a sintered product has excellent heat resistance and a low thermal expansion coefficient and yet has a crystal structure stabilized, as mentioned above, and will thus be a sintered product having excellent heat decomposition resistance and high mechanical strength.

As a result, a honeycomb filter made of such a sintered product has a thin wall honeycomb structure having a wall thickness of e.g. from 0.2 to 0.6 mm, preferably from 0.3 to 0.48 mm and a cell density of e.g. from 15 to 47 cells/cm$^2$. And, the porosity of the partition wall is, for example, from 30 to 70%, preferably from 40 to 60%, and the thermal expansion coefficient is e.g. at most $3.0\times10^{-6}K^{-1}$, preferably at most $1.5\times10^{-6}K^{-1}$. Such a honeycomb filter can be used with stability, from room temperature to 1,600° C. as the thermal decomposition reaction of aluminum magnesium titanate is suppressed even at a high temperature.

Figure 1:
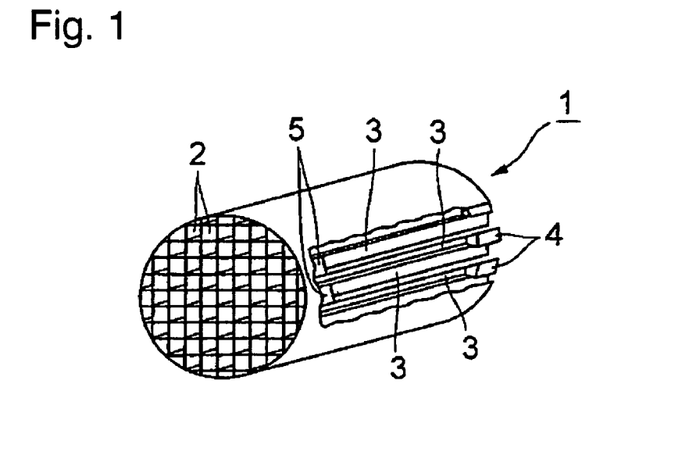
FIG. 1 is a perspective view showing an embodiment of a honeycomb filter for cleaning exhaust gas of the present invention, as partly cut off.
Figure 2:
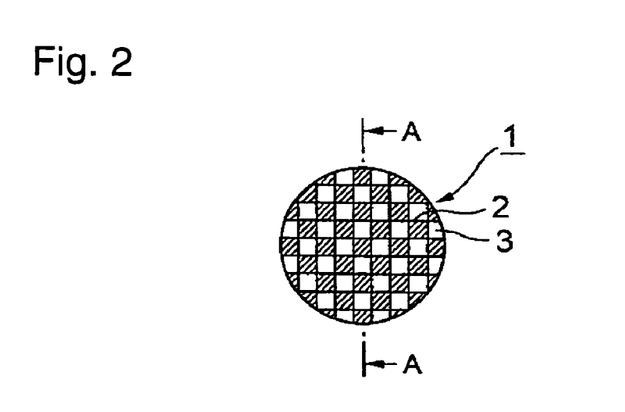
FIG. 2 is a diagrammatical view showing the end face of the honeycomb filter in FIG. 1.
Figure 3:
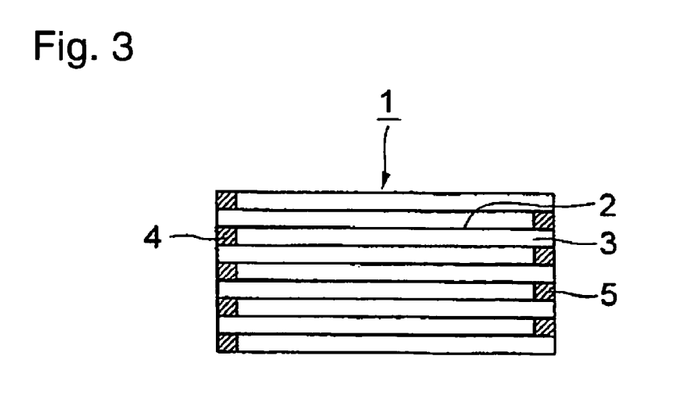
FIG. 3 is a cross-sectional diagrammatical view along line A-A of the honeycomb filter in FIG. 2.

FIG. 1 is a perspective view of an embodiment of the honeycomb filter for cleaning exhaust gas of the present invention. FIG. 2 is a diagrammatical view showing the end face of the honeycomb filter in Example 1. FIG. 3 is a diagrammatical view of the cross-section along line A-A of the honeycomb filter in FIG. 2. In these Figs., the honeycomb filter 1 for cleaning exhaust gas has both ends alternately plugged by blockers 4 and 5 at the upstream side and at the downstream side of a honeycomb filter comprising through-holes 3 constituted by many partition walls 2. Namely, as shown in FIG. 2, at the upstream or downstream side end, the through-holes 3 are plugged with blockers 4 or 5 in a lattice form, and with respect to each through-hole, either the upstream or downstream side end is plugged with a blocker 4 or 5. To such a honeycomb body, an exhaust gas to be cleaned is supplied to through-holes 3 on the upstream side of the honeycomb body and passed through the partition walls 2 to have particulates in the exhaust gas captured and removed by the partition walls 2, and then, the exhaust gas after the cleaning is taken out from the through-holes 3 on the downstream side.

The honeycomb filter for cleaning exhaust gas is preferably set in a can body by means of a suitable supporting material and is used to capture and remove fine solid particles (particulates) containing carbon as the main component, contained in an exhaust gas. With respect to the type of the exhaust gas, any gas discharged from a combustion source of either a stationary body or a mobile body may be treated. However, as mentioned above, the honeycomb filter is particularly useful for cleaning an exhaust gas from an automobile having a Diesel engine mounted where the severest properties are required.

EXAMPLES

Now, the present invention will be described in further detail with reference to Examples. However, it should be understood that the present invention is by no means thereby restricted.

Example 1

To 100 parts by mass of a mixture comprising 26.7 mass % (26 mol %) of easily sinterable α-alumina, 62.8 mass % (60 mol %) of anatase-type titanium oxide and 10.5 mass % (20 mol %) of periclase-type magnesium oxide present as a natural mineral, 0.25 parts by mass of polyvinyl alcohol as a binder, 1 part by mass of diethylamine as a peptizer, 0.5 part by mass of polypropylene glycol as a defoaming agent, and 50 parts by mass of activated carbon having a particle size of from 50 to 80 μm as a pore-forming agent, were added, mixed for 3 hours in a ball mill and then dried in a dryer at a temperature of 120° C. for at least 12 hours to obtain a raw material powder.

The obtained raw material powder was pulverized to an average particle size of at most 10 μm and formed by a vacuum forming machine (manufactured by Miyazaki Iron Works Co., Ltd.) to obtain a honeycomb formed product. This formed product was dried and then fired in the atmosphere at 1,500° C. for 2 hours and then left to cool, to obtain a totally cylindrical honeycomb filter having cross-sectionally square cells, as shown in FIGS. 1 to 3. The honeycomb filter had a wall thickness of 0.38 mm and a cell density of 31 cells/cm$^2$, and the outer diameter of the cylinder was 144 mm and the length was 152 mm.

Example 2

To 100 parts by mass of a mixture comprising 26.7 mass % (20 mol %) of easily sinterable α-alumina, 62.8 mass % (60 mol %) of anatase-type titanium oxide and 10.5 mass % (20 mol %) of periclase-type magnesium oxide present as a natural mineral, 4 parts by mass of an alkali feldspar represented by $(Na_{0.6}K_{0.4})AlSi_3O_8$, 0.25 part by mass of polyvinyl alcohol as a binder, 1 part by mass of diethylamine as a peptizer, 0.5 part by mass of polypropylene glycol as a defoaming agent, and 50 parts by mass of activated carbon having a particle size of from 50 to 80 μm as a pore-forming agent, were added and mixed for 3 hours in a ball mill and then dried in a dryer at 120° C. for at least 12 hours to obtain a raw material powder.

Using the obtained raw material powder, pulverization, forming, drying and firing were carried out in the same manner as in Example 1 to obtain a honeycomb filter having the same shape as in Example 1.

Comparative Examples

As materials for honeycomb filters, commercially available silicon carbide powder (tradename: SHOCERAM, manufactured by SHOWA DENKO K.K.), cordierite powder ($2MgO \cdot 2Al_2O_3 \cdot 5SiO_2$) and aluminum titanate powder ($Al_2O_3 \cdot TiO_2$) were respectively used, and from these materials, honeycomb sintered products of the same shape as in Example 1 were obtained by carrying out the conventional methods respectively. Here, the honeycomb made of silicon carbide will be referred to as Comparative Example 1, the honeycomb made of cordierite as Comparative Example 2, and the honeycomb made of aluminum titanate as Comparative Example 3.

Property Tests with Respect to Honeycomb Sintered Products

With respect to the honeycomb sintered products obtained in the above Examples 1 and 2 and Comparative Examples 1 and 2, the porosity (%), the thermal expansion coefficient ($\times 10^{-6} K^{-1}$) at from room temperature to 800° C., the thermal shock resistance (° C.) by an in-water dropping method, the softening temperature (° C.) and the compression strength (MPa) were measured, and the results are shown in Table 1. Here, the porosity was measured by a method in accordance with JIS R1634, the thermal expansion coefficient by a method in accordance with JIS R1618, the thermal shock resistance by a method in accordance with JIS R1648, the softening temperature by a method in accordance with JIS R2209, and the compression strength by a method in accordance with JIS R1608. Further, with respect to the compression strength, from each honeycomb sintered product, a square test specimen having cross-sectionally 5×5 cells and a length of 15 mm, was cut out, and this specimen was measured from three directions i.e. (A) in the lengthwise axial direction (axial), (B) in the vertical direction (tangential) and (C) in the direction inclined by 45° from the lengthwise axis (diagonal).

Here, the remaining ratio of aluminum magnesium titanate was obtained by the following method from the spectrum of the X-ray diffraction measurement (XRD).

Firstly, as $MgAl_2O_4$ (spinel) and $TiO_2$ (rutile) are formed when aluminum magnesium titanate undergoes thermal decomposition, by using the integrated intensity ($I_{TiO2(110)}$) of the diffraction peak at the (110) face of rutile and the integrated intensity ($I_{MAT(023)}$) of the diffraction peak at the (023) face of aluminum magnesium titanate, the intensity ratio R of aluminum magnesium titanate to rutile was obtained by the following formula:

$$R = I_{MAT(023)}/(I_{MAT(023)} + I_{TiO2(110)})$$

Further, also with respect to the sintered product before carrying out the thermal treatment at 1,100° C., the intensity ratio $R_0$ of aluminum magnesium titanate to rutile was obtained in the same manner. Then, using R and $R_0$ obtained as described above, the remaining ratio α (%) of aluminum magnesium titanate was obtained by the following formula $$\alpha = (R/R_0) \times 100$$

Further, from the honeycomb filter in Comparative is Example 3, a test specimen of 10 mm×10 mm×10 mm was cut out and held in a high temperature atmosphere of 1,100° C., whereby the change with time of the remaining ratio β (%) of aluminum titanate was investigated, and a comparison with Examples 1 and 2 was carried out.

Here, the remaining ratio of aluminum titanate was obtained by the following method from the spectrum of the X-ray diffraction measurement (XRD).

Firstly, as $Al_2O_3$ (corundum) and $TiO_2$ (rutile) are formed when aluminum titanate undergoes thermal decomposition,

TABLE 1

| | Porosity | Thermal expansion coefficient | Thermal shock resistance | Softening temperature | Compression strength (MPa) | | |
|---|---|---|---|---|---|---|---|
| | (%) | ($10^{-6} K^{-1}$) | (° C.) | (° C.) | (A) | (B) | (C) |
| Example 1 | 50 | 0.1 | 860 | 1600 | >9 | >1.5 | >0.8 |
| Example 2 | 48 | 1.0 | 850 | 1580 | >12 | >2 | >1 |
| Comparative Example 1 | 42 | 4.0 | 400 | — | >6 | >5 | >1.5 |
| Comparative Example 2 | 45 | 0.6 | 650 | 1320 | >10 | >1.3 | >0.2 |

As is evident from Table 1, each of the honeycombs in Examples 1 and 2 and Comparative Examples 1 and 2, has a porosity within a range of from 40 to 60% and a compression strength sufficient for mounting. However, it is evident that each of the honeycombs in Examples 1 and 2 has a thermal expansion coefficient very much smaller than that in Comparative Example 1 and has a softening temperature very much higher than that in Comparative Example 2. Further, it is evident that with respect to the thermal shock resistance, each of the honeycomb sintered products in Example 1 and 2 has a property very much higher than that in Comparative Example 2.

Thermal Decomposition Resistance Test

From each of the honeycomb filters in Examples 1 and 2, a test specimen of 10 mm×10 mm×10 mm was cut out and held in a high temperature atmosphere of 1,100° C., whereby the change with time of the remaining ratio α (%) of aluminum magnesium titanate was investigated to carry out a thermal decomposition resistance test.

using the integrated intensity ($I_{TiO2(110)}$) of the diffraction peak at the (110) face of rutile and the integrated intensity ($I_{AT(023)}$) of the diffraction peak at the (023) face of the aluminum titanate, the intensity ratio r of aluminum titanate to rutile was obtained by the following formula:

$$r = I_{AT(023)}/(I_{AT(023)} + I_{TiO2(110)})$$

Further, also with respect to the sintered product before carrying out the thermal treatment at 1,100° C., the intensity ratio $r_0$ of aluminum titanate to rutile was obtained in the same manner. Then, using r and $r_0$ obtained as described above, the remaining ratio β(%) of aluminum titanate was obtained by the following formula:

$$\beta = (r/r_0) \times 100$$

Figure 4:
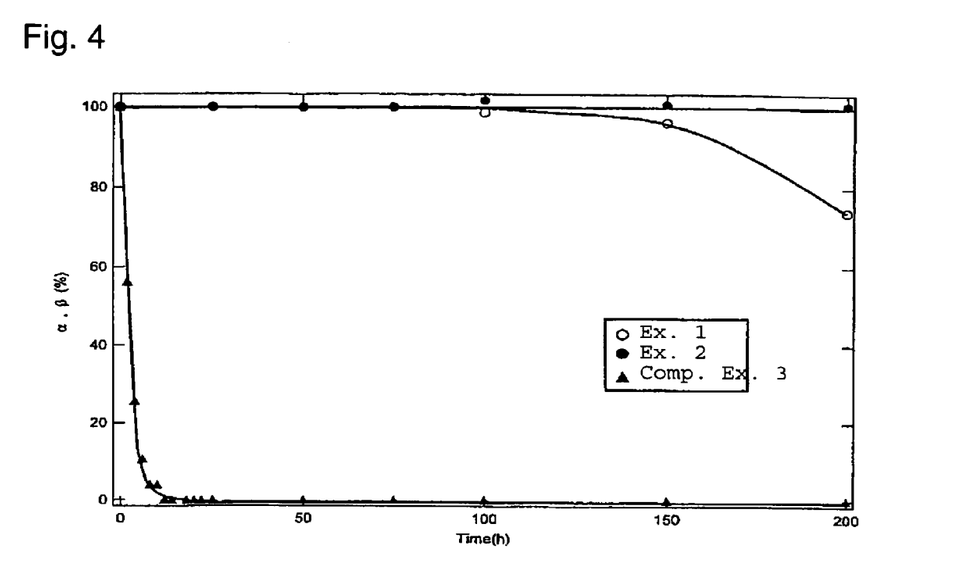
FIG. 4 shows the changes with time of the remaining ratios α of aluminum magnesium titanate with respect to the sintered products in Examples 1 and 2 and the remaining ratio β of aluminum titanate with respect to the sintered product in Comparative Example 3.

With respect to the respective honeycomb-shaped sintered products in Examples 1 and 2 and Comparative Example 3, the changes with time of the remaining ratios α and β of the respective crystals (aluminum magnesium titanate in Examples 1 and 2, and aluminum titanate in Comparative Example 3) are shown by a graph in FIG. 4. As is evident from FIG. 4, Examples 1 and 2 are superior in the thermal decomposition resistance, as the remaining ratios are maintained at high levels over a long time, as compared with Comparative example 3. Further, it is evident that while the remaining ratio in Example 1 after expiration of 200 hours in FIG. 4 is slightly low, the remaining ratio in Example 2 is still maintained at a high level and thus shown that the thermal decomposition resistance is further improved over Example 1.

Examples 3 to 8

Easily sinterable α-alumina, anatase-type titanium oxide and periclase-type magnesium oxide were mixed in the ratio as shown in Table 2 to obtain a raw material mixture.

TABLE 2

| | Mol % of raw materials to be blended | | |
|---|---|---|---|
| | $Al_2O_3$ | $TiO_2$ | MgO |
| Example 3 | 43 | 52 | 5 |
| Example 4 | 33 | 56 | 11 |
| Example 5 | 25 | 58 | 17 |
| Example 6 | 15 | 62 | 23 |
| Example 7 | 9 | 64 | 27 |
| Example 8 | 2 | 66 | 32 |

To 100 parts by mass of the obtained mixture, 4 parts by mass of an alkali feldspar represented by the chemical formula $(Na_{0.6}K_{0.4})AlSi_3O_8$, 0.25 part by mass of polyvinyl alcohol as a binder, 1 part by mass of diethylamine as a peptizer, 0.5 part by mass of polypropylene glycol as a defoaming agent and 50 parts by mass of activated carbon having a particle size of from 50 to 80 μm as a pore-forming agent, were added and mixed in a ball mill for 3 hours and then dried in a dryer at 120° C. for at least 12 hours to obtain a raw material powder.

Using the obtained raw material powder, pulverization, forming, drying and firing were carried out in the same manner as in Example 1 to obtain a honeycomb filter of the same shape as in Example 1.

With respect to the honeycomb sintered products obtained in Examples 3 to 8, their properties were tested in the same manner as in Example 1. The results are shown in Table 3. In Table 3, the value X in the empirical formula $Mg_xAl_{2(1-x)}Ti_{(1+x)}O_5$ is also disclosed.

As is evident from Table 3, each of the sintered products in Examples 3 to 8 has a porosity within a range of from 40 to 60% and a compression strength sufficient for mounting and has a small thermal expansion coefficient, a high thermal shock resistance and a high softening temperature.

Further, with respect to each honeycomb filter, the change with time of the remaining ratio α (%) of aluminum magnesium titanate in the case of holding it in the atmosphere of 1,100° C., was obtained in the same manner as in Examples 1 and 2. With respect to each sintered product, the remaining ratio α (%) of aluminum magnesium titanate upon expiration of 150 hours and upon expiration of 200 hours is shown in Table 4. In Table 4, the results of measurements with respect to the sintered products in Examples 1 and 2 and Comparative Example 3 are also presented.

TABLE 4

| | Remaining ratio α of aluminum magnesium titanate (%) | |
|---|---|---|
| | Upon expiration of 150 hours | Upon expiration of 200 hours |
| Example 1 | 95.9 | 76.5 |
| Example 2 | 100 | 100 |
| Example 3 | 99.9 | 99.9 |
| Example 4 | 100 | 100 |
| Example 5 | 100 | 99.9 |
| Example 6 | 99.9 | 99.8 |
| Example 7 | 100 | 100 |
| Example 8 | 100 | 100 |
| Comparative Example 3 | 0 | 0 |

As is evident from Table 4, the sintered product in each Example has excellent heat decomposition resistance.

INDUSTRIAL APPLICABILITY

The honeycomb filter material made of an aluminum magnesium titanate sintered product by the present invention, is excellent in heat resistance and has high heat decomposition resistance and high mechanical strength, while maintaining a small thermal expansion coefficient and heat shock resistance, and thus has substantially superior properties as compared with conventional filter materials. As a result, the honeycomb filter for exhaust gas of the present invention is useful to remove fine solid particles in an exhaust gas from a combustion source of either a stationary body or a mobile body. Especially, as mentioned above, it is most suitable for clean-

TABLE 3

| | Value X | Porosity (%) | Thermal expansion coefficient ($\times 10^{-6} K^{-1}$) | Thermal shock resistance (° C.) | Softening temperature (° C.) | Compression strength (MPa) | | |
|---|---|---|---|---|---|---|---|---|
| | | | | | | (A) | (B) | (C) |
| Example 3 | 0.1 | 55 | 0.1 | 860 | 1680 | >14 | >6 | >2 |
| Example 4 | 0.25 | 57 | 0.9 | 860 | 1650 | >15 | >5 | >2 |
| Example 5 | 0.4 | 50 | 1.2 | 850 | 1610 | >16 | >8 | >4 |
| Example 6 | 0.6 | 49 | 1.2 | 850 | 1600 | >16 | >6 | >2 |
| Example 7 | 0.75 | 42 | 1.9 | 820 | 1570 | >17 | >6 | >3 |
| Example 8 | 0.95 | 40 | 2.1 | 800 | 1550 | >20 | >8 | >5 | ing an exhaust gas from an automobile having a Diesel engine mounted, where the severest properties are demanded.

The invention claimed is:

1. A honeycomb filter for cleaning exhaust gas, wherein the material for the honeycomb filter is an aluminum magnesium titanate sintered product obtained by firing at from 1000 to 1700° C. a mixture consisting of
    100 parts by mass, as calculated as oxides, of a blend consisting of a Mg-containing compound, an Al-containing compound and a Ti-containing compound in the same metal component ratio as the metal component ratio of Mg, Al and Ti in aluminum magnesium titanate represented by the empirical formula $Mg_xAl_{2(1-x)}Ti_{(1+x)}O_5$ (wherein $0.25 \leq x<1$), where the blend consists of the elements Mg, Al, Ti and O, and optionally at least one of C, N and S; and
    1 to 10 parts by mass of an alkali feldspar represented by the empirical formula $(Na_yK_{1-y})AlSi_3O_8$ (wherein $0 \leq y \leq 1$),
    the aluminum magnesium titanate sintered product comprises aluminum magnesium titanate having a crystal lattice, and
    Si is solid-solubilized in the crystal lattice of the aluminum magnesium titanate.

2. The honeycomb filter for cleaning exhaust gas according to claim 1, wherein the honeycomb filter has a wall thickness of 0.2 to 0.6 mm and a cell density of from 15 to 47 cells/cm$^2$, wherein the porosity of the partition wall is from 30 to 70%, and the thermal expansion coefficient is at most $3.0 \times 10^{-6} K^{-1}$.

3. A process for producing a honeycomb filter for cleaning exhaust gas, characterized by
    preparing a mixture consisting of
        100 parts by mass, as calculated as oxides, of a blend consisting of a Mg-containing compound, an Al-containing compound and a Ti-containing compound in the same metal component ratio as the metal component ratio of Mg, Al and Ti in aluminum magnesium titanate represented by the empirical formula $Mg_xAl_{2(1-x)}Ti_{(1+x)}O_5$ (wherein $0.25 \leq x<1$), where the blend consists of the elements Mg, Al, Ti and O, and optionally at least one of C, N and S; and
        1 to 10 parts by mass of an alkali feldspar represented by the empirical formula $(Na_yK_{1-y})AlSi_3O_8$ (wherein $0 \leq y \leq 1$),
    adding molding assistants to the mixture,
    then kneading the mixture to plasticize the mixture to make the mixture extrusion-processable,
    then extrusion processing the mixture into a honeycomb structure,
    then firing the honeycomb structure at from 1000 to 1700° C., and
    producing the honeycomb filter of claim 1.

4. The process for producing a honeycomb filter for exhaust gas according to claim 3, wherein the average particle sizes of the respective components contained in the mixture are at most 30 μm.

5. An apparatus for cleaning exhaust gas, characterized in that the honeycomb filter for cleaning exhaust gas as defined in claim 1 is accommodated in a can.

6. A method for cleaning diesel engine exhaust gas, comprising
    passing the exhaust gas through the apparatus of claim 5.

* * * * *